(12) United States Patent
Barna et al.

(10) Patent No.: US 7,436,442 B2
(45) Date of Patent: Oct. 14, 2008

(54) LOW LIGHT SENSOR SIGNAL TO NOISE IMPROVEMENT

(75) Inventors: Sandor L. Barna, Pasadena, CA (US); Eric R. Fossum, LaCrescenta, CA (US)

(73) Assignee: Micron Technology, Inc., Boise, ID (US)

( * ) Notice: Subject to any disclaimer, the term of this patent is extended or adjusted under 35 U.S.C. 154(b) by 837 days.

(21) Appl. No.: 10/774,495

(22) Filed: Feb. 10, 2004

(65) Prior Publication Data

US 2004/0165088 A1 Aug. 26, 2004

Related U.S. Application Data

(63) Continuation of application No. 09/359,065, filed on Jul. 21, 1999, now Pat. No. 6,765,613.

(60) Provisional application No. 60/093,842, filed on Jul. 22, 1998.

(51) Int. Cl.
*H04N 5/217* (2006.01)
*H04N 5/225* (2006.01)
*H04N 9/64* (2006.01)
*H04N 5/335* (2006.01)
*H01L 27/00* (2006.01)

(52) U.S. Cl. .................... 348/241; 348/216.1; 348/243; 348/248; 348/300; 250/208.1

(58) Field of Classification Search ................ 348/241, 348/216.1, 300, 301, 243, 248
See application file for complete search history.

(56) References Cited

U.S. PATENT DOCUMENTS

| | | | |
|---|---|---|---|
| 5,272,535 A | 12/1993 | Elabd | |
| 5,417,215 A | 5/1995 | Evans et al. | |
| 5,708,263 A | 1/1998 | Wong | |
| 5,880,777 A | 3/1999 | Savoye et al. | |
| 5,909,026 A * | 6/1999 | Zhou et al. ................ | 348/317 |
| 5,909,244 A | 6/1999 | Waxman et al. | |
| 5,949,483 A | 9/1999 | Fossum et al. | |
| 6,057,539 A | 5/2000 | Zhou et al. | |
| 6,118,115 A | 9/2000 | Kozuka et al. | |
| 6,166,769 A | 12/2000 | Yonomoto et al. | |
| 6,201,572 B1 | 3/2001 | Chou | |
| 6,320,617 B1 | 11/2001 | Gee et al. | |
| 6,590,198 B1 | 7/2003 | Zarnowski et al. | |
| 7,002,628 B1 * | 2/2006 | Panicacci ................ | 348/222.1 |

* cited by examiner

*Primary Examiner*—Nhan T Tran
(74) *Attorney, Agent, or Firm*—Dickstein Shapiro LLP

(57) ABSTRACT

A number of different elements are added together in a staggered way to avoid the total loss of resolution caused by the binning process. The circuit for doing this includes a variable gain. In a second circuit for carrying this out, to fixed pattern noise reduction circuits are used.

20 Claims, 5 Drawing Sheets

LOW LIGHT SENSOR SIGNAL TO NOISE IMPROVEMENT

CROSS REFERENCE TO RELATED APPLICATIONS

The present application is a continuation application of U.S. patent application No. 09/359,065, filed on Jul. 21, 1999, now U.S. Pat. No. 6,765,613, which claims the benefit of U.S. provisional application Ser. No. 60/093,842, filed on Jul. 22, 1998 the disclosures of which are incorporated by reference herein.

BACKGROUND

An image sensor can be used in low illumination conditions. It can be necessary to amplify the signal from the sensor used in this way. One typical way of doing this is to "bin" the pixels. For example, a group of four pixels is taken together, and handled as a group. This obtains the signal from all four pixels as an increased-level pixel.

A similar issue can exist when high frame rates are used, where each frame of received signal can be integrated only for a relatively short period of time.

High speed readout produces additional similar issues. Specifically, the high speed readout can be read in bursts. Each of the bursts can be for example a unit, e.g., row or a column, of output of the image sensor. Each unit can be associated with its own unit amplifier to allow the effective unit amplification to be carried out faster. However, unit-to-unit fixed pattern noise can result from mismatched in amplifier voltage offset or gain.

SUMMARY

The present system teaches a device which amplifies according to a combined operation that reduces fixed pattern noise and reduces offsets among the column amplifiers.

BRIEF DESCRIPTION OF THE DRAWINGS

These and other aspects will now be described in detail with reference to the accompanying drawings, wherein.

DESCRIPTION OF THE EMBODIMENTS

A disclosed embodiment reads the pixels out in column-parallel mode, wherein an entire row of pixels is read-out at a single time. The pixels can be active pixels that have a photoreceptor, an in-pixel buffer transistor and an in-pixel selection transistor. The signal-to-noise response of this circuitry can be improved by binning the signals from adjacent units, (here rows) and using the binned result as the output for both rows. This doubles the resulting signal, but adds the noise in quadrature. Hence, the noise only increases by 1.4 while the signal increases by 2.

Previous binning operations have reduced the vertical resolution of the sensor by 2.

A disclosed embodiment described herein performs a post-amplification staggered row addition. This produces a number of outputs, each of which has a different output value. The first output 102 corresponds to a sum of row 1+row 2. The second output corresponds to row 2+row 3. Adders 101 and 103 are shown for carrying out the addition; however, a single adder could be used.

Hence, each row is used twice, and the same, or almost the same, number of binned signals are obtained as rows. The output signal is still, in general, doubled, while the noise increases only by 1.4. However, this system can have a smaller resolution reduction.

Figure 1:
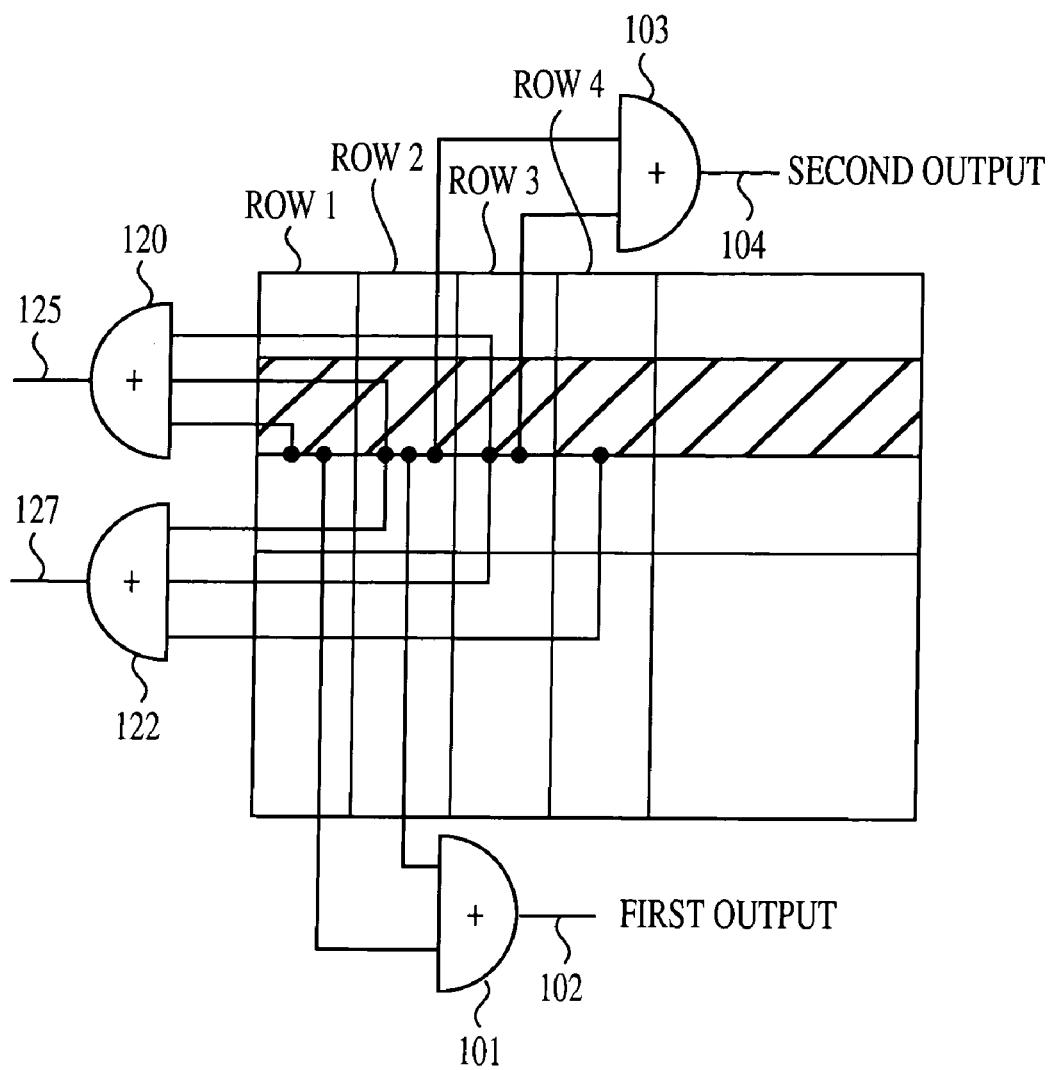
FIG. 1 shows a first embodiment of a multiple binning system.

Another embodiment also shown in the left most part of FIG. 1 generalizes this approach to the addition of more than two rows. For example, in this second embodiment, row 1+row 2+row 3 is added by adder 120, to form a tripled signal 125. Another tripled signal 127 is formed by using adder 122 to add row 2+row 3+row 4. In general, n units are added, and each unit is used n times. However, this trades off image sharpness against noise. This feature effectively carries out a smoothing function and hence can reduce image sharpness.

Figure 2A:
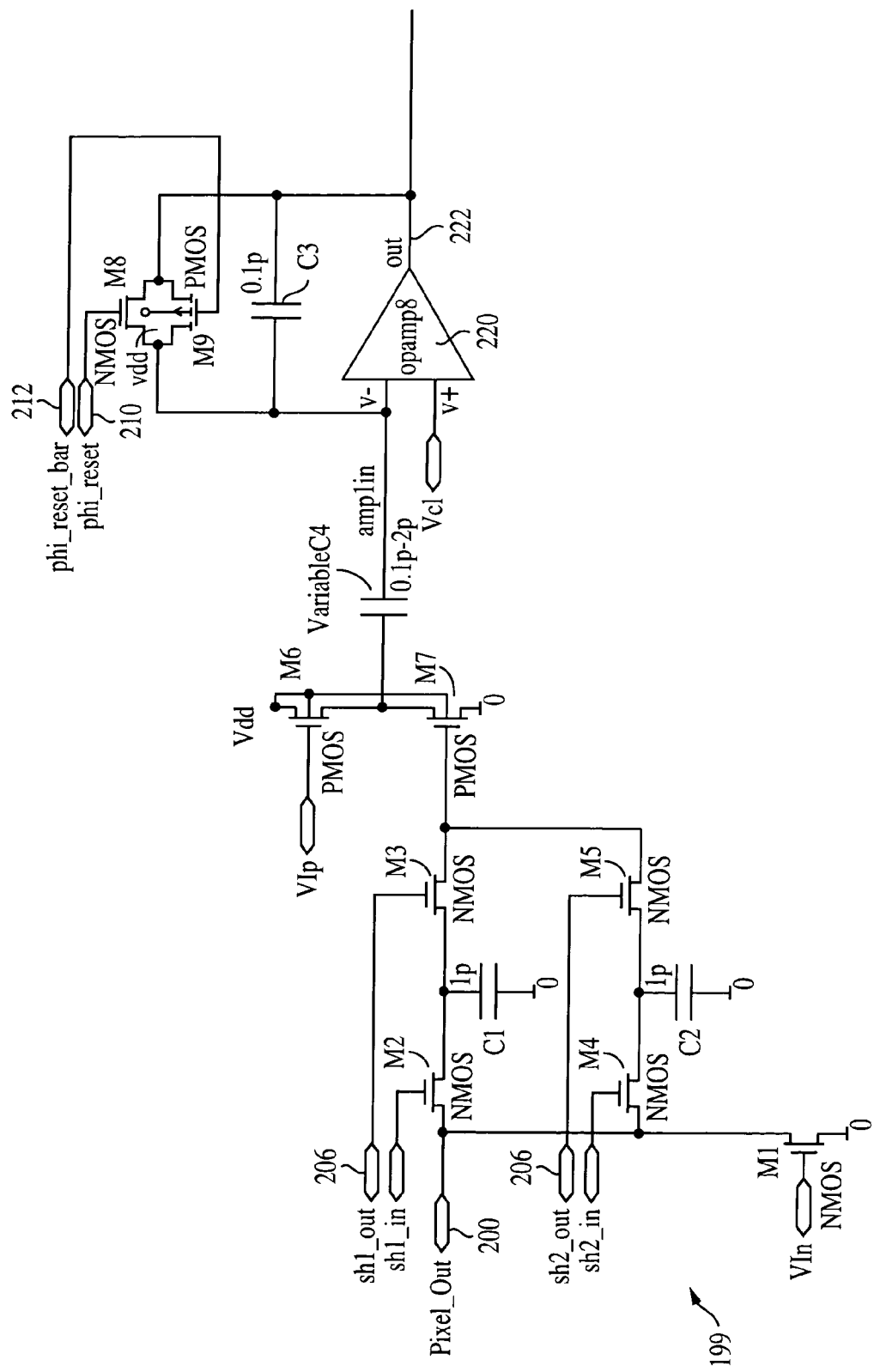
FIGS. 2A and 2B show a circuit for amplification and fixed pattern noise rejection.
Figure 2B:
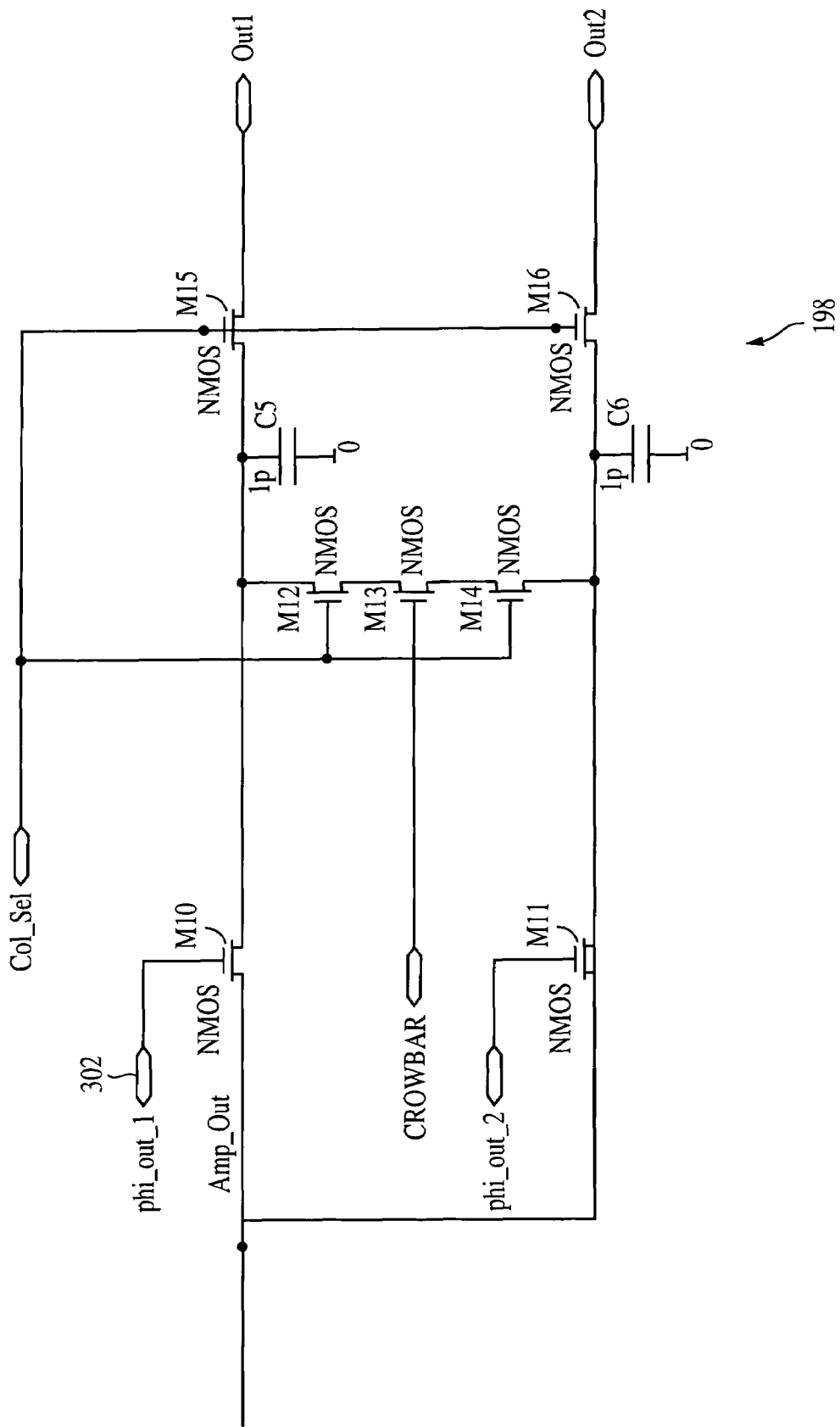

FIGS. 2A and 2B show an embodiment of an amplifier 199 for noise-reduced column wise gain. The operation is described herein with reference to the timing chart of FIG. 3. This timing chart also shows the separation between the row timing, which is carried out simultaneously for all columns, and the column readout timing, which is carried out one column at a time.

Each pixel output is connected to the pixel out node 200. First, the pixel reset voltage is sampled onto the capacitor C1, by turning on the NMOS transistor M2 using the Sh1_in control signal. The signal voltage is subsequently sampled onto capacitor C2 similarly using the Sh2_in control signal via the transistor M4. An amplification cycle is then initiated, by resetting the amplifier using the phi_reset control signal 210 and phi_reset_bar control signal 212. These turn on the CMOS reset switches M8/M9 thereby shorting across the capacitor C3. At the same time, the NMOS switch M3 is turned on via the control signal Sh1_out 206, thereby feeding the reset level to the gate of PMOS follower M7 and charging the capacitor VC4.

The gain of the signal is set by a variable capacitor variable C4. During the reset phase, the amplifier output settles to the reset voltage Vclamp ($V_{CL}$) which is applied to the non-inverting input of the of the op amp 220, plus Vos which represents the offset of the amplifier 220. This voltage level is used to clamp the variable capacitance variable C4. Hence, this voltage is sampled onto capacitor C5 shown in FIG. 2B by turning on the NMOS switch M10. The NMOS switch M10 is controlled by the control signal phi_out_1 302.

The amplifier is then released from reset by allowing phi_reset_bar and phi_reset to go inactive, and by allowing phi_out_1 to go inactive. This begins the amplification phase. First, the pixel signal level is connected to PMOS source follower M7 by making SH1_out inactive to turn off M3, and making SH2_out active to turn on M5. This connects the signal level from pixel out to the PMOS M7 causing its output to slew to a new level. This reduces the charge on one plate of capacitor VC4, pumping the other plate according to form a voltage delta V d⁻ signal-reset. This causes the op amp 220, correspondingly, to settle to a new level. As conventional, the output 222 of the op amp settles to a new level which restores input node B− to its original level (here $V_{CL}$).

The new level at the op amp output 222 corresponds to VCL+Vos+deltaV*(C4/C3). This value is sampled onto capacitor C6 via the NMOS switch M11 controlled by the control signal phi_out_2. The above represents the actions in the rows.

The columns are then processed. The column output is then sampled using a fixed pattern noise rejection crowbar circuitry. The crowbar process shorts the plates of capacitors C5 and C6, providing a voltage shift between the two output nodes, that corresponds to the difference between voltages on C5 and C6. The sum of the two voltage shifts is carried out by turning on all of transistors M12, M13 and M14. This cancels the common components and provides a voltage output equal to deltaV×(C4/C3). All amplifier and transistor offset voltages are completely removed. Hence, the fixed pattern noise only results from column-to-column variations in the value of C4/C3. C3 can be sized to e.g. 0.1 pf, to render this variation insignificant.

The integration/reset speed of this circuit is determined by the gain-bandwidth characteristics (GBW) of the amplifier 220 based on its load. The load can include capacitors C5 or C6 depending on the connection. The integration time is approximately equal to gain over CBW. The gain bandwidth of the amplifier in the reset phase of the cycle can lower due to the increased load ≈C5+gain*C3. However in reset, the closed loop gain is 1. Hence, the reset time is 1+gain to (1/GBW), which can ten times faster. Hence, reset can be done much faster than sampling.

Figure 4:
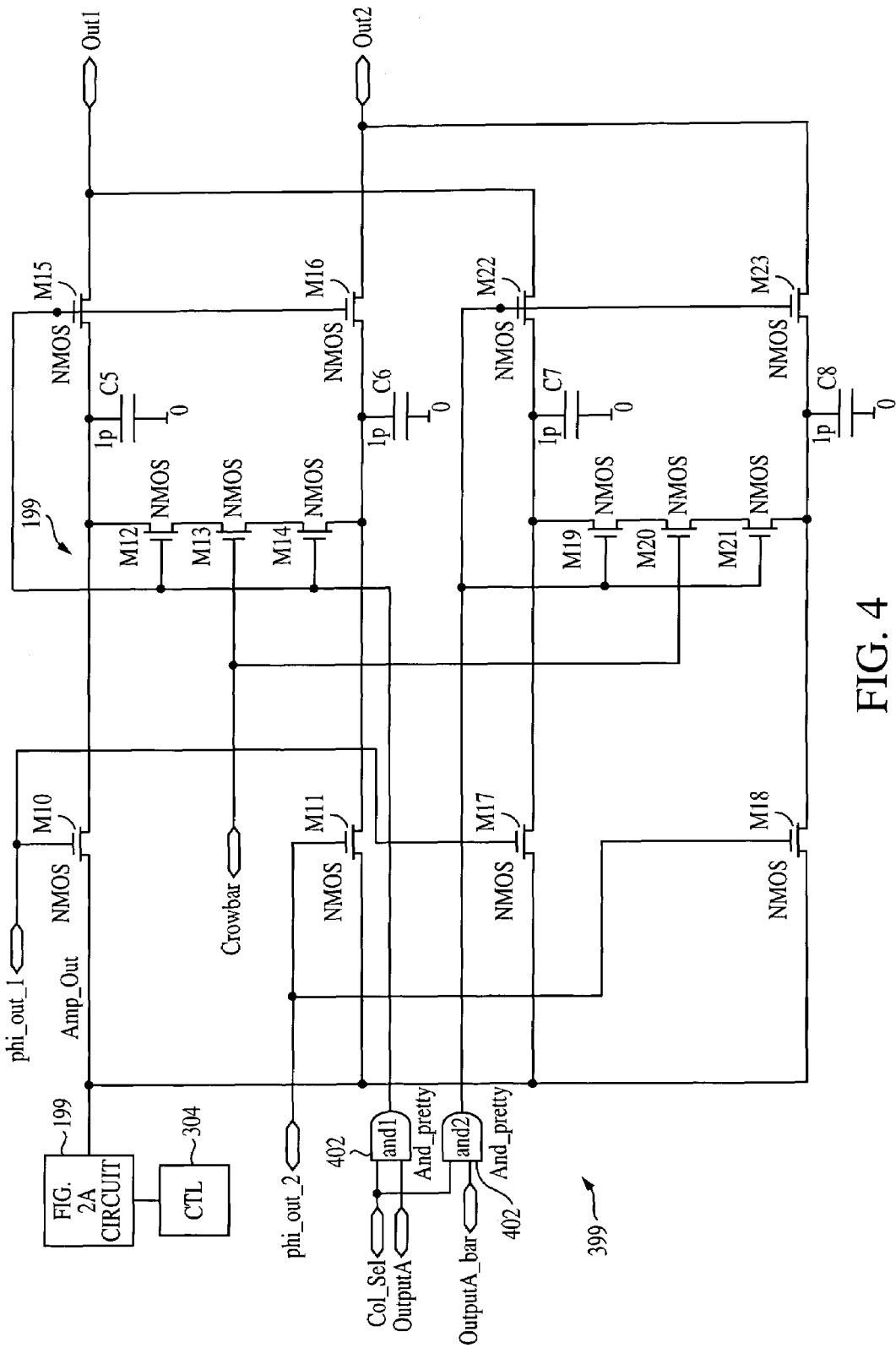
FIG. 4 shows a dual output stage circuit for adding.

FIG. 4 shows this same circuit being used for sequential row addition. The input/amplification stage 199 of FIG. 2A is connected to the FPN stage 198 of FIG. 2B. A second fixed pattern noise rejection circuit 399 is formed in parallel with the first FPN stage 198. Two "and" gates 402, 404 control the selection of the FPN circuits. The first array 198 output is selected using the signal output A. A low value for output A (output_A_bar) selects the second output array 399.

Figure 3:
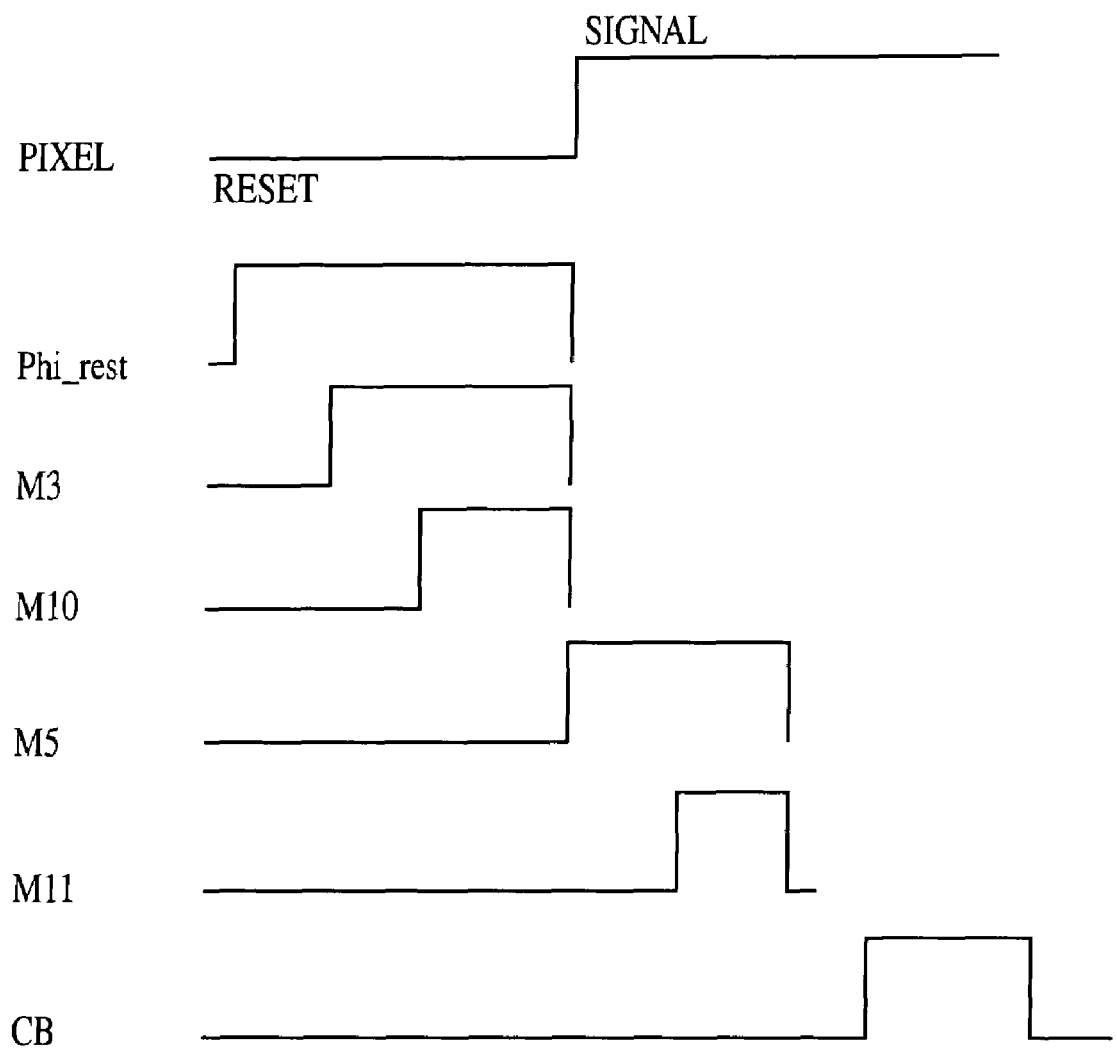
FIG. 3 shows a timing chart of signals in the FIG. 2A/2B circuit.

Timing of the signals in FIG. 3 controls whether the gain of the circuit is positive or negative. Amplification can be inverted by reversing the order of closure of switches M3 and M5. For example, if the reset level C1 is connected during the reset phase and the signal level C2 during amplification, then the final output level is Vos+Vclamp+gain*(Signal-Reset). If the order is reversed, however, the final output level becomes Vos+Vclamp+Gain*(Reset-Signal). This reverses the sense of the signal.

Controller 304 produces the signals to alternate the order of amplification in each successive row. The result is stored in either of the capacitors C5 or C7 if phi_out is active, or C6/C8 if phi_out_2 is active. While the reset level is never stored, the output level can be stored.

For readout, either the top pair of capacitors C5/C6 or the bottom pair of capacitors C7/C8 is shorted using the crowbar scheme described above. The signal circuit in FIG. 4 shows two separate crowbars M12-M14 and M19-M21. Thus, the total output voltage shift is (Vos+Vclamp+Gain*(Signal-Reset)$_{(row\ i)}$–(Vos+Vclamp+Gain*(Reset-Signal)$_{(row\ i+1)}$). Since the clamp voltage Vclamp, the offset voltage Vos, and the Gain are the same in both terns, this reduces to G*(Signal-Reset)|$_{Row\ i}$+(Signal-Reset)|$_{Row\ i+1}$.

The amplifier reset level Vos+$V_{CL}$ does not need to be subtracted from each row independently, since that value is always from the FIG. 2A circuit and hence is the same each time. Two independent output stages allow storing the value from one row for addition to the next row without destroying it during the crowbar readout. This enables each pair of rows to be sequentially added. For example, rows 1+2 can be added in the pair C5/C6. Rows 2+3 can be added in the pair C7/C8. Rows 3+4 can be again added in the pair C5/C6.

Although only a few embodiments have been described in detail above, other embodiments are contemplated by the inventor and are intended to be encompassed within the following claims. In addition, other modifications are contemplated and are also intended to be covered.

What is claimed is:

1. An image sensor comprising:
 a plurality of image sensor pixels to provide a plurality of respective reset and signal voltages; and
 a noise reduction circuit, said noise reduction circuit being adapted to receive a first amplified image signal formed of first reset and signal voltages and a second amplified image signal formed of second reset and signal voltages, and being adapted to output a combination of said first and second amplified image signals at a first time, and said noise reduction circuit being adapted to receive a third amplified image signal formed of third reset and signal voltages and being adapted to output a combination of said second and third amplified image signals at a subsequent time;
 wherein said noise reduction circuit includes a first fixed pattern noise reduction circuit, having a first capacitor element to store a difference between said first reset and signal voltages and a second capacitor element to store a difference between said second reset and signal voltages, and a second fixed pattern noise reduction circuit, having a third capacitor element to store said difference between said second reset and signal voltages and a fourth capacitor element to store a difference between said third reset and signal voltages;
 wherein said combination of said first and second amplified image signals includes a combination of said difference between said first reset and signal voltages and said difference between said second reset and signal voltages; and
 wherein said combination of said second and third amplified image signals includes a combination of said difference between said second reset and signal voltages and said difference between said third reset and signal voltages.

2. A sensor as in claim 1, wherein said noise reduction circuit receives said amplified image signals and removes at least one amplifier offset therefrom.

3. A sensor as in claim 2 wherein said amplifier offset includes amplifier offsets from different rows of a column.

4. A sensor as in claim 2, further comprising an amplifier having said amplifier offset coupled between said plurality of image sensor pixels and said noise reduction circuit, wherein said amplifier includes an operational amplifier, a feedback capacitor connected across said operational amplifier, and a variable gain-setting capacitor at an input to said operational amplifier.

5. A sensor as in claim 4, further comprising a reset transistor, coupled across said feedback capacitor, to reset a value of said feedback capacitor.

6. A sensor as in claim 1, wherein said image sensor pixels are active pixels, each of which including a photoreceptor, and an in-pixel buffer transistor and an in-pixel selection transistor.

7. A sensor as in claim 1, wherein said first fixed pattern noise reduction circuit is operable to store said third reset and signal voltages on said first capacitor element to thereby re-use said third reset and signal voltages at two different times.

8. A method of binning pixels, comprising:
 first providing a plurality n of amplified pixel signals at a first time;

adding said n amplified pixel signals together to provide a first n-binned signal;

second providing another plurality n of amplified pixel signals at a second time, wherein said another plurality n of amplified pixel signals includes n−1 of the same amplified pixel signals as obtained in said first providing;

adding said another plurality n of amplified pixel signals to provide a second n-binned signal different from the first n-binned signal; and using at least two separate noise reduction circuits, a first of which reduces noise in a first amplified pixel signal, a second of which reduces noise in a second amplified pixel signal, and said first and second amplified pixel signals being used to form said first n-binned signal, said second amplified pixel signal being retained for use with a third amplified pixel signal later processed by said first noise reduction circuit to form said second n-binned signal.

9. A method as in claim 8 wherein n=2.

10. A method as in claim 8, wherein said first providing comprises obtaining a chronologically first amplified pixel signal and subsequently obtaining a chronologically second amplified pixel signal, and said adding to provide said first n-binned signal comprises adding said chronologically first and chronologically second amplified pixel signals.

11. A method as in claim 10, wherein said second providing comprises obtaining a chronologically third amplified pixel signal, and wherein said adding to provide said second n-binned signal comprises adding said chronologically second and chronologically third amplified pixel signals.

12. A method as in claim 8, further comprising removing offsets from amplifiers that amplify said amplified pixel signals, prior to adding said pixel signals.

13. A method as in claim 8 wherein n=2.

14. A binning sensor, comprising:

a plurality of pixels arranged in an array;

a configurable adder, selectively connected to add a plurality n of adjacent row pixel values to one another at a first time and then to add another plurality of said adjacent row pixel values to one another at a second time, wherein said plurality n of adjacent row pixel values and said another plurality of adjacent row pixel values have at least one common pixel value corresponding to a respective at least one common row element; and an offset reduction circuit, removing certain amplifier offsets from said pixel values prior to said adding;

wherein said offset reduction circuit is operable to store first pixel values of said plurality n of adjacent row pixel values not corresponding to said at least one common row element on first capacitor elements for use at the first time, to subsequently store second pixel values of said another plurality of said adjacent row pixel values not corresponding to said at least one common row element on said first capacitor elements for use at the second time, and to store third pixel values corresponding to said at least one common row element on second capacitor elements for use at the first time and the second time.

15. A sensor as in claim 14, wherein the number of pixels added equals n and said offset reduction circuit includes n noise reduction circuit parts.

16. An image sensor comprising:

a plurality of image sensor pixels, including first, second, third, and fourth pixels to provide respective first, second, third, and fourth pixel signals; and a noise reduction circuit to provide a first combined pixel signal at a first time based on said first and second pixel signals, a second combined pixel signal at a second time based on said second and third pixel signals, and a third combined pixel signal at a third time based on said third and fourth pixel signals; and a plurality of capacitor elements, including first, second, third, and fourth capacitor elements, wherein said first and second capacitor elements store respective said first and second pixel signals for said first combined pixel signal, wherein said third and fourth capacitor elements store respective said second and third pixel signals for said second combined pixel signal, and wherein said first and second capacitor elements store respective said third and fourth pixel signals for said third combined pixel signal.

17. An image sensor as in claim 16, further comprising:

an amplifier to amplify said first, second, third, and fourth pixel signals, said amplifier including:

an operational amplifier having an inverting input terminal, a non-inverting input terminal, and an output terminal;

a feedback capacitor coupled between said output terminal and said inverting input terminal; and a variable gain-setting capacitor coupled to said inverting input terminal.

18. An image sensor as in claim 17, wherein said noise reduction circuit is configured to remove at least one amplifier offset of said amplifier.

19. An image sensor as in claim 16, wherein said first, second, third, and fourth pixels are active pixels, each including a photoreceptor, an in-pixel buffer transistor, and an in-pixel selection transistor.

20. An image sensor comprising:

a plurality of image sensor pixels including at least first, second, and third pixels to provide respective sets of first, second, and third reset and signal voltages; and a noise reduction circuit to receive first, second, and third amplified image signals formed of differences between the reset and signal voltages of the respective first, second, and third sets, the noise reduction circuit including a first fixed pattern noise reduction circuit having
a first capacitor element to store the first amplified image signal,
a second capacitor element to store the second amplified image signal, and
circuitry configured to combine the first and second amplified signals to provide a first combined signal at a first time; and a second fixed pattern noise reduction circuit having
a third capacitor element to store the second amplified image signal,
a fourth capacitor element to store the third amplified image signal, and
circuitry configured to combine the second and third amplified signals to provide a second combined signal at a second time that is different from the first time.

* * * * *

UNITED STATES PATENT AND TRADEMARK OFFICE
CERTIFICATE OF CORRECTION

PATENT NO. : 7,436,442 B2
APPLICATION NO. : 10/774495
DATED : October 14, 2008
INVENTOR(S) : Barna et al.

It is certified that error appears in the above-identified patent and that said Letters Patent is hereby corrected as shown below:

On the Title page, in field (75), in "Inventors", in column 1, line 2, delete "LaCresccnta" and insert -- LaCrescenta --, therefor.

Signed and Sealed this

Seventeenth Day of March, 2009

JOHN DOLL
*Acting Director of the United States Patent and Trademark Office*